July 2, 1935. T. D. LAZARIDES 2,006,956

VEHICLE BODY CONSTRUCTION

Filed Aug. 26, 1933 5 Sheets-Sheet 1

July 2, 1935.　　　　T. D. LAZARIDES　　　　2,006,956
VEHICLE BODY CONSTRUCTION
Filed Aug. 26, 1933　　　　5 Sheets-Sheet 2
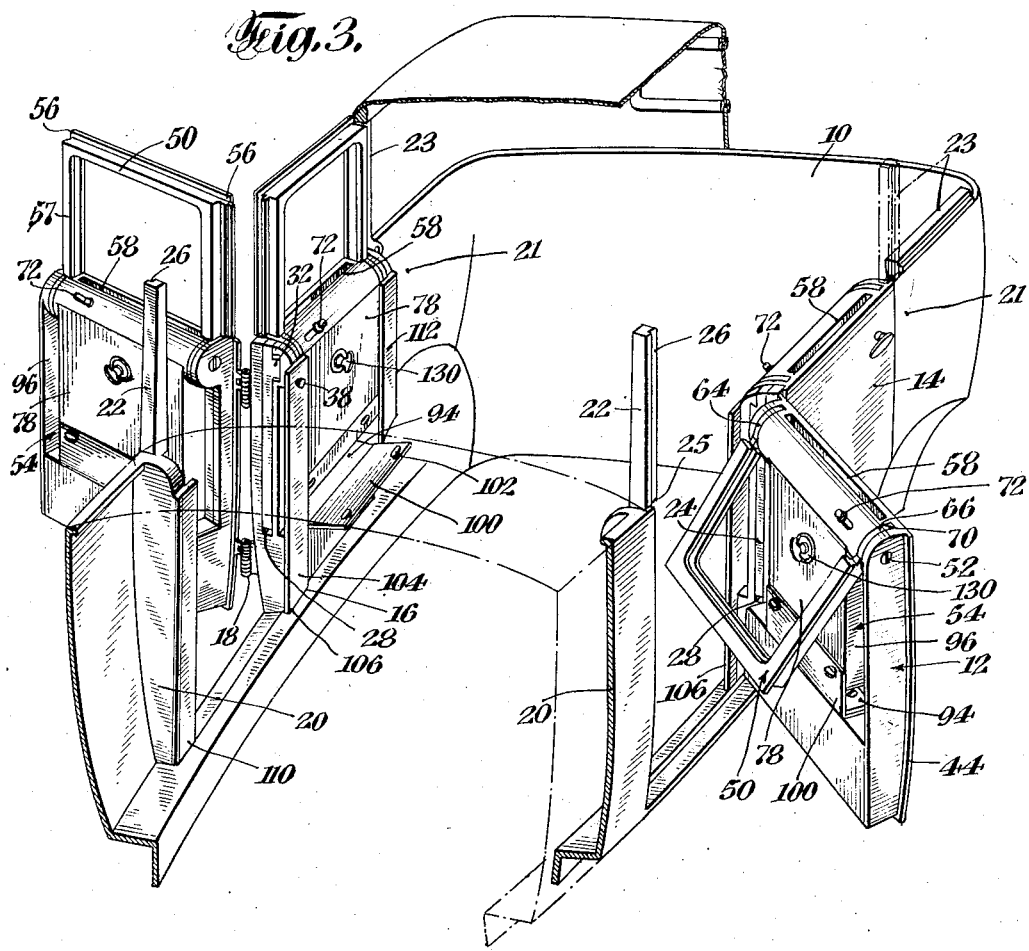
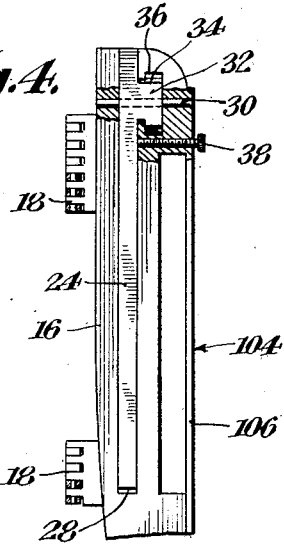
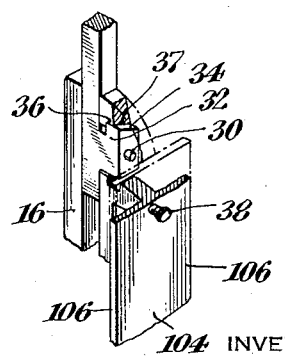
INVENTOR
Thrasybule D. Lazarides
BY
Prindle Bean & Mann
ATTORNEYS

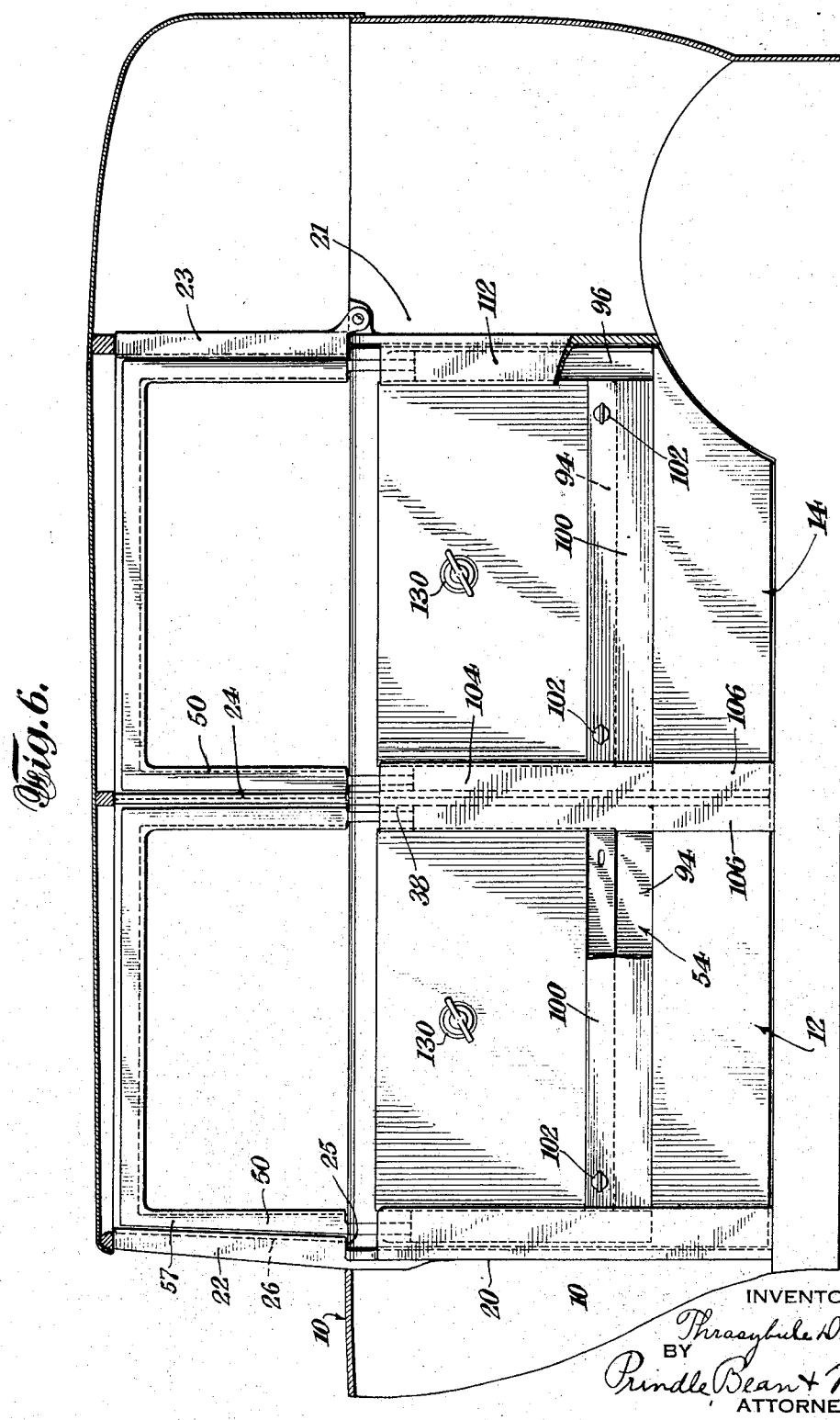

July 2, 1935. T. D. LAZARIDES 2,006,956
VEHICLE BODY CONSTRUCTION
Filed Aug. 26, 1933 5 Sheets-Sheet 4
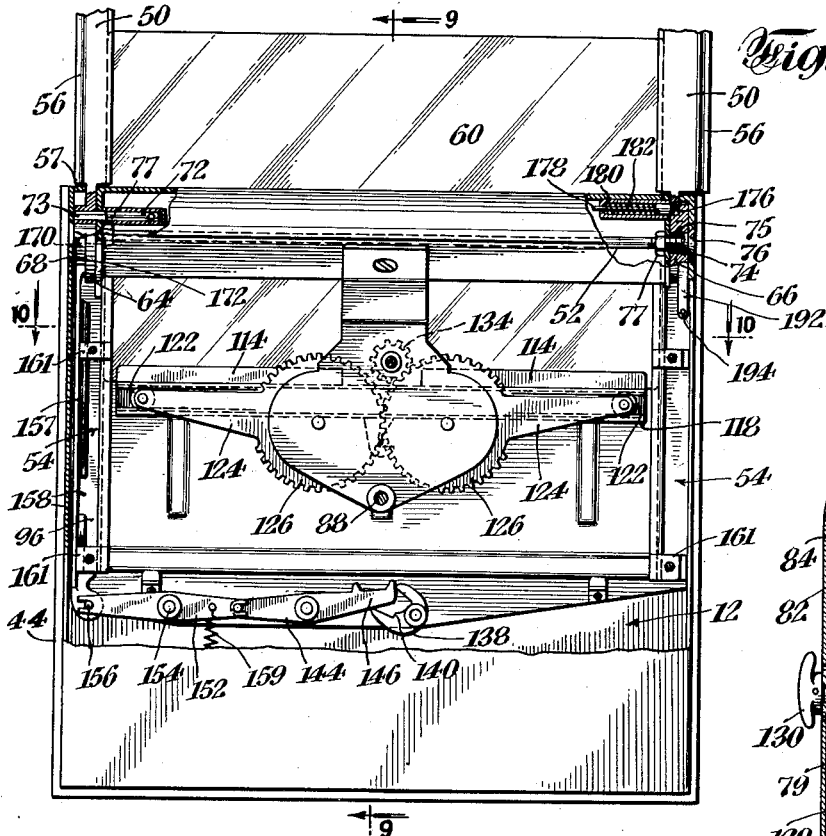
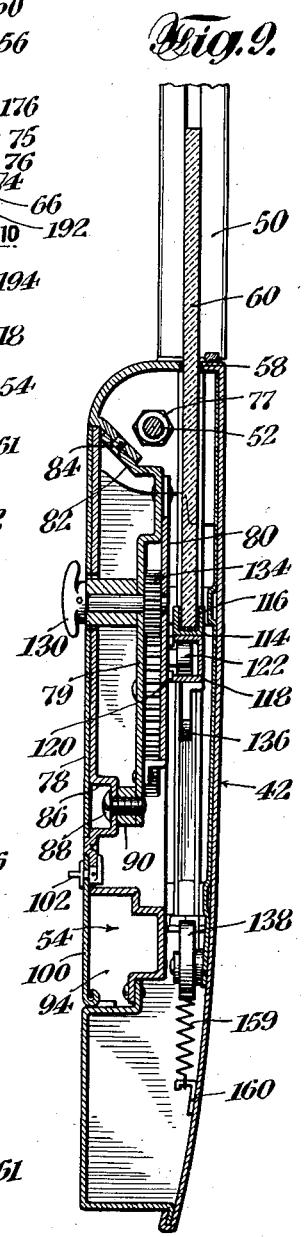
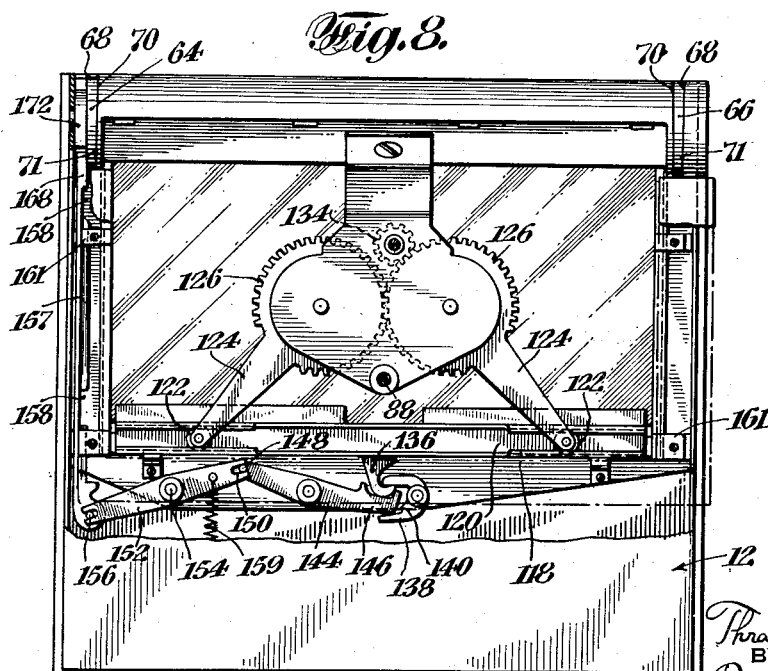
INVENTOR
Thrasybule D. Lazarides
BY
Prindle Bean & Mann
ATTORNEYS

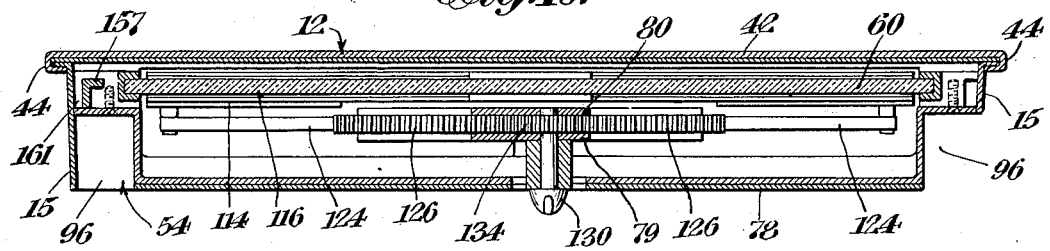
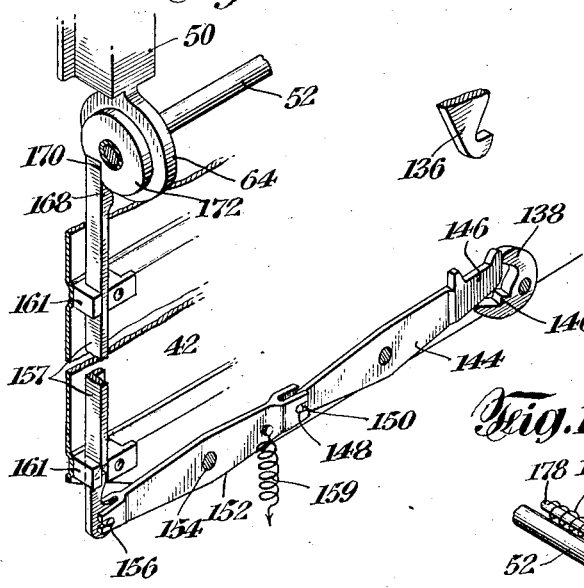
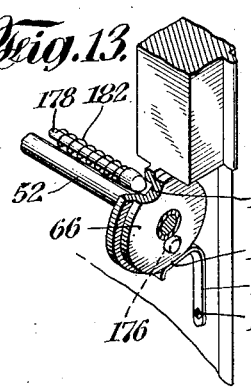
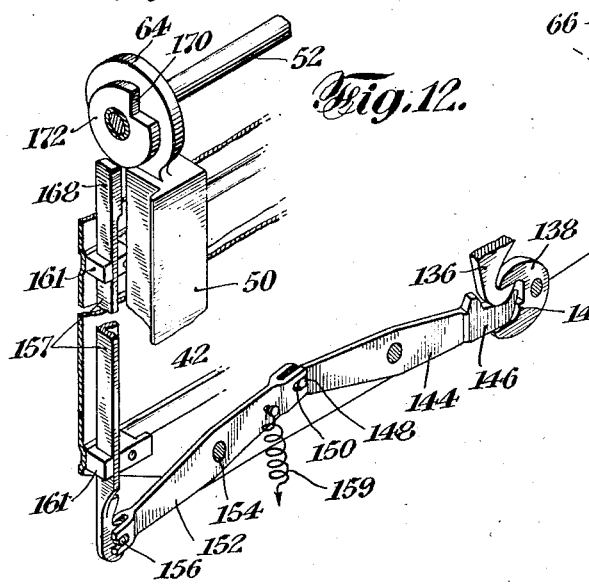
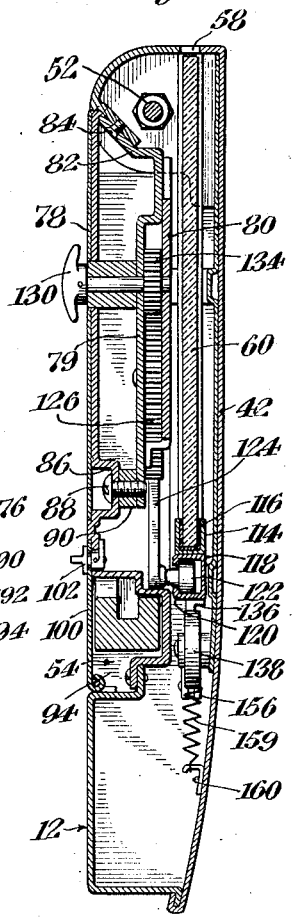

Patented July 2, 1935

2,006,956

UNITED STATES PATENT OFFICE 2,006,956

VEHICLE BODY CONSTRUCTION

Thrasybule D. Lazarides, New York, N. Y.

Application August 26, 1933, Serial No. 686,868

12 Claims. (Cl. 296—45)

This invention relates to automobile constructions which may be used as closed cars and which may be quickly converted into open cars by lowering the windows, sash frames, and stanchions.

One object of my invention is the provision of an automobile construction having doors with interfitting parts so as to eliminate intermediate posts or brackets between the doors.

Another object of my invention is the provision of a vehicle door having a pivoted sash frame which may be moved to concealed position.

Another object of my invention is the provision of a door construction having a pivoted sash frame and means for automatically locking the sash frame in raised or lowered positions.

A further object of my invention is the provision of guard or projecting members on the body construction to conceal portions of the sash frame.

To the accomplishment of the foregoing, and such other objects as may hereinafter appear, this invention comprises the construction, combination and arrangement of parts hereinafter described and then sought to be defined in the appended claims, reference being had to the accompanying drawings forming a part hereof, and which show merely for the purpose of illustrative disclosure, a preferred embodiment of my invention, it being expressly understood, however, that various changes may be made in practice within the scope of the claims without digressing from my inventive idea.

In the drawings:

Fig. 3 represents a perspective view of the body shown in Fig. 1 with certain of the doors shown in open position to facilitate the disclosure.

Fig. 4 represents an enlarged front elevation of the brace showing the bracket in closed position, parts being shown in section to facilitate the disclosure.

Fig. 5 represents an enlarged detail of the construction of the pivoting of the bracket shown in Fig. 4.

Fig. 6 represents an interior elevation of a vehicle body with the doors closed.

Fig. 7 represents an elevation view of the interior of a door with the inner panel removed to facilitate the disclosure.

Fig. 8 represents a view similar to Fig. 7 with the window in lowered position.

Fig. 9 represents a vertical transverse cross section taken substantially on line 9—9 of Fig. 7.

Fig. 10 represents a horizontal longitudinal cross section taken substantially on line 10—10 of Fig. 7.

Fig. 11 represents a detail of the locking mechanism for the hinged sash member.

Fig. 12 represents a view similar to Fig. 11 with the locking mechanism in unlocked position.

Fig. 13 represents a detail of means for assisting in holding the upper hinged sash member in closed or open position.

Fig. 14 represents a vertical transverse cross section of a door showing the window in lowered position.

Figure 1:
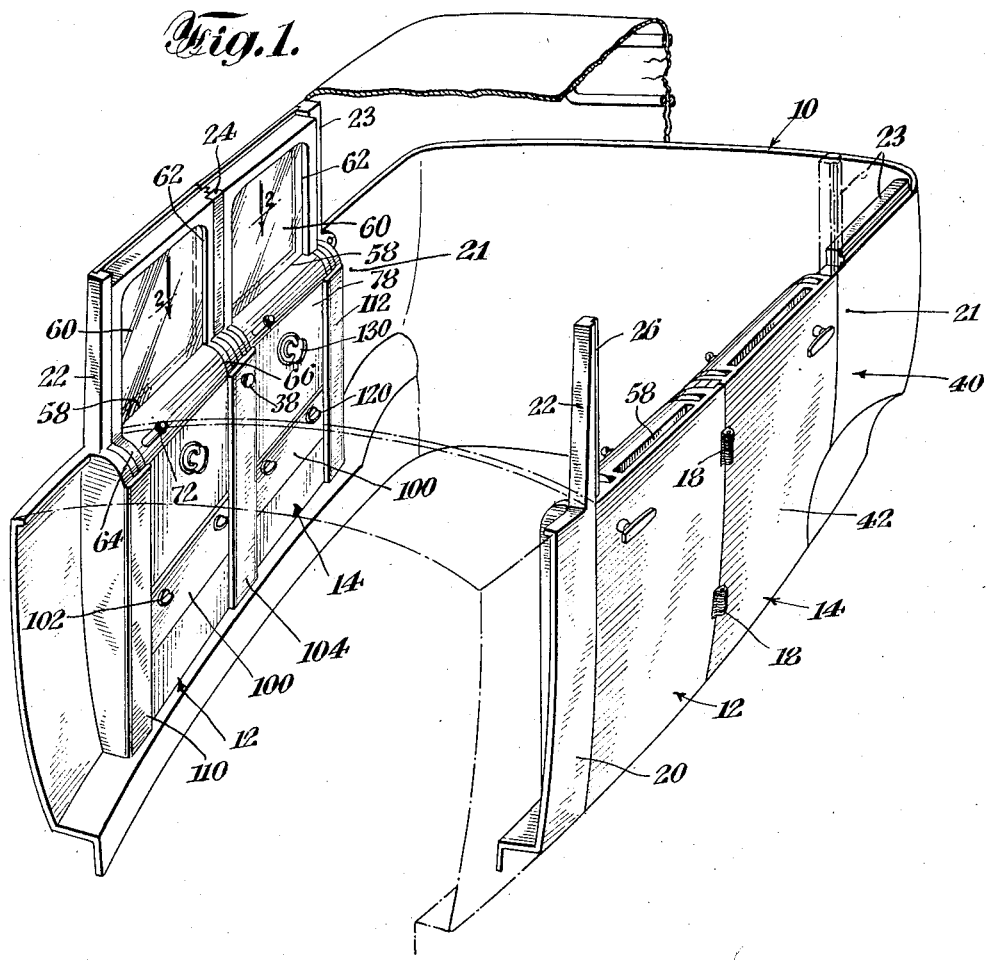
Fig. 1 represents a perspective view of one form of a vehicle body embodying my invention.

Referring now to the drawings, the reference character 10 generally designates the body of a vehicle having the front doors 12 and rear doors 14. The sides of the doors are beveled as at 15. The doors are suspended on the outer section of the stay braces 16 by standard type hinges 18. Of course, I can suspend one door on the stay brace and the other door on the front posts 20 or rear portion 21 of the body depending on the type of door opening desired. The body is provided with the rigid front stanchions 22, rear hinged posts or stanchions 23 and intermediate brackets 24 pivoted to braces 16 (see Fig. 4). Rear posts 23 may be held in raised or lowered position by any suitable means or standard construction. The front stanchions 22 are extended beyond the door opening at 25 and are provided with the groove 26 to receive a portion of the hinged sash frame later to be described. Each stay brace 16 is provided with a vertical groove 28 to receive the bracket 24 when the bracket is in lowered position. Each bracket 24 is pivotally mounted on a pintle 30 to the upper portion of the stay brace and is formed with an offset shoulder 32 having the tapering sides 34 which cooperate with the socket 36 having inclined sides 37 in the stay brace 16. These sides 34 and 37 cooperate to limit the movement of bracket 24. A screw 38 is provided in the brace 16 for securing the bracket in raised or lowered position, the bracket in raised position having the tapering sides 34 in contacting relation with inclined sides 37 of socket 36. Each bracket 24 is adapted to provide support for the folding top frame and to cooperate with the inner section of the sash frames (presently to be described) when they are in lowered position. It is to be noted that no braces or extensions are required between the sash frames when they are converted upwardly as used on all existing present types. The rear stanchions or posts 23 and intermediate brackets 24 are pivoted so that they may be lowered and removed from sight when the vehicle is to be converted into an open one. The rear stanchions or posts may be turned backward as shown in Figs. 1 and 3. The outer portion 40 of the body is curved and the outer panels 42 of the doors are curved to conform to the shape of the body. The doors at their sides have flanges 44 which are adapted to form a seal with the body. The body is provided with channels to receive the flanges 44 so that the flanges are flush with the rest of the body.

The door construction is the same for all doors and will now be described in connection with front door 12. Each door construction is provided with a sash frame comprising a swinging U-type frame portion 50 which is hinged to door 12 on rod or axle 52 so that the frame can be rotated and moved to concealed position in a chamber 54 formed in the inner wall of the door 12. Frame portion 50 is provided with the flange portions 56. The forward side portion 56 is adapted to be received by channel 26 in stanchion 22. It is to be noted that the front end 57 of the sash frame is set back from the door. See Fig. 7. The door is provided with an opening 58 for the window 60. The sash frame is provided with a groove 62 for the window 60 (see Fig. 2). The groove may be provided with any lining desired. The lower ends of the sash frame terminate in flat disks 64 and 66 which are rotatably mounted on rod 52. The disks are tapered so that the bottom portion 68 of each disk is slightly thicker than the rest of the disk. The door 12 is slotted as at 70 to receive the disks 64, 66 of the sash frame 50. The rod or axle 52 is adjustable and holds the parts tightly so that the sash frame is held in any position and does not fall down. The slots have inclined sides which are closer at the bottom as at 71 so as to cooperate with the disks 64 and 66 and assist in the raising and lowering of the sash frame 50 (see Fig. 8). The sides of the slot are not parallel but at the point 71 are closer together and due to the relatively tight construction the parts form retarding means for a portion of the movement of the sash frame 50. Due to this constricted portion the operator has to exert more force on the sash frame 50 and also in lowering the frame so as to cause the frame to snap into upper or lower complete extended position. For locking the sash frame in raised position a slidable bolt 72 is provided in the door which is adapted to be received in opening 73 in the arm of sash frame 50. See Figs. 1 and 7. The rod or axle 52 is adjustably mounted in the door and comprises the rod or axle 52 having threaded ends 74 received in the internally threaded sleeve 75 having a kerf 76. A lock nut 77 is provided adjacent the sleeve 75 and abuts a portion of the door as shown in Fig. 7. By this construction it is possible to move the disks on the sash frame and change the amount of tension applied to the sash frame so that it may be harder or easier to move the sash frame to its various positions.

The door 12 comprises the outer panel 42, inner panel 78 and intermediate spaced plates 79 and 80. The plate 79 is secured to the inner panel 78 by bent portion 82 and screw 84 (see Fig. 14) at its upper end. At its lower end the plate 79 is secured to indented portion 86 of panel 78 by screw 88 and spacer means 90. Plate 80 is rigidly secured to plate 79 in any manner. The window in lowered position is between outer panel 42 and intermediate plates 79 and 80. The inner panel 78 is provided with the chamber 54 for receiving the sash frame comprising a horizontal channel 94 and vertical channels 96. In this way standard thickness of the doors is maintained and the sash frame is hidden from view. With this construction the present standard window regulator can still be used. It is to be understood that before the sash frame 50 is lowered, it is necessary to lower the window 60 of the door. A cover or pocket flap 100 is provided for horizontal channel 94 for safely securing the frame 50 in lowered position. The attaching means 102 for the cover or flap 100 may be of conventional type.

The stay brace 16 is provided with a projecting flat guard member 104 having projecting sides 106 which are wide enough to protect and cover the sides of the sash frames when in lowered position and with the doors closed. The front post 20 and rear portion 21 are provided with projecting guard members 110, 112, adapted to protect and cover the sides of the lowered sash frames.

The means for lowering and raising the window and for locking the sash frame 50 in raised position until the window is completely lowered will now be described. The intermediate plates 79 and 80 are adapted to carry the means for operating the window of the door. The window is mounted in a frame comprising U-shaped horizontal elongated members 114 having linings 116. These members 114 are carried by a channel member 118 having a flanged opening 120. The member 118 receives rollers 122 rotatably mounted on the ends of gear arms 124 on meshing gears 126. These rollers 122 are held within the channel member 118 by the flanges on opening 120 and are adapted to move within the channel to raise or lower the window 60 when the gear arms 124 are raised or lowered by rotating gears 126. The gears are rotatably mounted on intermediate plates 79 and 80. A handle member 130 having gear 134 is rotatably mounted in inner panel 78 and intermediate plates 79 and 80. The gear 134 is in mesh with one of the meshing gears 126 so that rotation of the gear 134 causes rotation of gears 126 and movement of gear arms 124 and consequent movement of the window 60.

Secured to the center and bottom of channel member 118 is a hook 136 which is adapted to cooperate with a pivotally mounted hook member 138 and a plurality of interconnected links to form a safety locking means for the sash frame 50. The hook member 138 is substantially U-shaped and has a shoulder 140. Pivoted intermediate its ends and adjacent said hook member 138 is a link 144 having a hook portion 146 at one end adapted to cooperate with hook 136 and hook member 138 to securely hold the parts when the window is in lowered position. When the hook 136 is down as in Fig. 12, hook portion 146 of link 144 abuts the shoulder 140 on hook member 138 to lock the parts in this position against accidental removal so that window 60 can not be moved while sash frame 50 is not in the correct position to receive the window. At its other end the link 144 has a pin 148 which is received in the slotted end 150 of another link 152 pivoted at 154 intermediate its ends. The other end of link 152 is also slotted to receive a pin 156 on vertically movable arm 157 which is substantially L-shaped in cross section and has cut out portions 158. A spring 159 is attached at one end to stationary finger 160 and at its other end to link 152 in order to yieldingly assist in unlocking the hook members when it is desired to raise the window. The vertical arm 157 is guided in its movement by members 161. The cut out portions 158 are adapted to fit over guide members 161 to facilitate assembly. The arm 157 is provided with a square upper end 168 adapted to be received by a shoulder 170 formed in cam disk 172 secured to disk 64 on the lower end of sash frame 50. When the window is in raised position the parts are as shown in Fig. 11, and when the window is partially lowered the parts are in the same locked position. When the window is in complete lowered position the hook 136 is lowered and forces hook portion 146 of link 144 down. This movement actuates link 152 due to the interconnections of the links and pulls arm 157 downwardly to remove end 168 from shoulder 170 in cam disk 172 and thereby unlock the sash frame so that the sash frame 50 may be rotated and moved into concealed position.

A sash frame lock is provided to hold the frame in raised or lowered position so that it tends to remain in such position unless the latch is released. This sash frame lock comprises the disk 66 (Fig. 13) formed with two countersunk openings 176 adapted to receive the rounded head of latch rod 178. The rod 178 is mounted in a sleeve 180 within the door 12 and is surrounded by a coiled spring 182. At one end the spring abuts the sleeve 180 and at its other end abuts the rounded head of rod 178 to urge the rod against disk 66 and into the openings. This construction locks the sash frame automatically and holds it firmly when it is in either complete raised or lowered positions.

A further safety device comprises the cam portion 190 on disk 66 which is adapted to cooperate with the flat bent spring 192 attached to the door 12 at 194. If the operator has failed to raise the sash frame to the regular raised position, the spring 192 automatically moves the sash frame to correct position so that the doors will interlock properly when closed. In addition to this safety device the tapered disks and the tapered slots assist in causing the sash frame to assume vertical raised and lowered positions.

Figure 2:
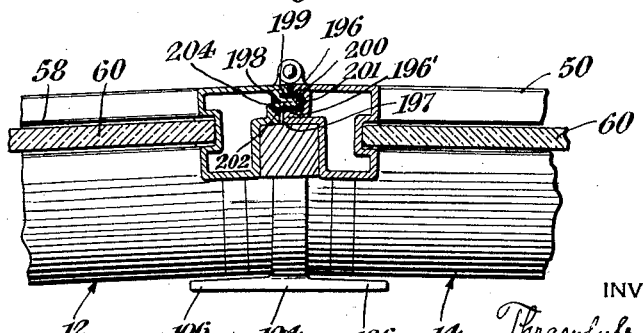
Fig. 2 represents a partial horizontal cross section taken substantially on line 2—2 of Fig. 1.

A further part of my invention comprises the interlocking construction on the adjacent sides of the upper members of the front and rear doors. This construction makes it possible to dispense with the intermediate bracket for most purposes. Figs. 1 and 2 show the interlocking construction. The sash frame 50 of one door is provided with a groove or channel 196 having a longer side 197. The cooperating sash frame 50 is provided with the tongue 198 adapted to be received by groove 196. The tongue has slightly tapered sides 199 and a convex type point 200. The groove 196 also has slightly tapered sides 196' and a concave bottom 201. The tongue 198 has a longer side 202 adapted to cooperate with the longer side 197 of the groove so as to form a relatively tight construction. A lining 204 of any suitable material may be provided.

The sash frames when moved or converted upwardly are adapted to interlock one with the other as above explained to give the appearance of a closed body and also make the body air tight to give all the advantages of a closed body. The tongue and channel are so constructed that when they are moved downwardly they interlock at an angular position somewhat different from the angular position when the sash frame is up but the tongue and channel cooperate to form a relatively tight seal. This is possible because the adjacent shoulders of the tongue and channel do not abut.

The operation will now be described. When it is desired to transform the vehicle into an open one, it is first necessary to completely lower the window 60 so that hook 136 forces hook member 138 down and member 138 being connected to vertical arm 157 by the links 144 and 152 causes downward movement of square end 168 and removal thereof from the pocket 170 in the cam disk 172. It is then necessary to move the slidable bolts 72 toward the back to unlock the sash frame. The sash frame 50 is lowered into chamber 54 and flap 100 is drawn over a part of the chamber. When the door is closed guard plates 106, 110, 112 cover the rest of chamber 54 to conceal other parts of the sash frame.

From the above description it will be apparent that I have disclosed relatively simply constructions which are compact and practical and which provide convertible open car and closed car bodies for vehicles.

In my copending application on Vehicle body construction having removable posts, Serial No. 686,869, filed Aug. 26, 1933, I have a disclosure of a vehicle body construction including some subject matter common to the subject matter in the present application which is claimed herein, but which is not claimed in said application, Serial No. 686,869, and which is directed to means for facilitating raising and lowering the sash frames and means for locking the sash frames when the windows are not completely down.

What I claim is:

1. A vehicle body including, in combination, a plurality of pivotally mounted sash frames, one of said frames being provided on one side with a groove, and another of said frames being provided with a projecting tongue adapted to cooperate with said groove to provide a substantially air tight construction without using a stanchion or the like when the sash frames are in raised position.

2. A vehicle body including, in combination, a plurality of sash frames movable to concealed position, one of said frames being provided on one side with a groove, another of said frames being provided with a projecting tongue adapted to cooperate with said groove to provide substantially air tight construction without using a stanchion or the like, said tongue and groove being so constructed that they cooperate when the sash frames are in concealed condition to prevent relative movements of the parts during operation of the vehicle.

3. A device of the character described, including, a lower door portion, a sash frame pivoted thereon, a window slidably mounted in said door portion and said sash frame, means for raising or lowering said window, and means for locking said sash frame in raised position when said window is raised, said locking means including a disk on said sash frame and an arm actuated by said window raising means and cooperating with said disk.

4. A device of the character described, including, a lower door portion, a sash frame pivotally mounted thereon and adapted to be moved to upper operative position or lower concealed position, a window slidably mounted in said door portion and said sash frame, and means in said lower door portion for preventing the raising of said window when said sash frame is in lowered position, said means comprising a plurality of interlocking hook members.

5. A device of the character described, including a lower door portion, a sash frame pivotally mounted thereon and adapted to be moved to upper operative position or lower concealed position, a window slidably mounted in said door portion and said sash frame, and means in said lower door portion for preventing the raising of said window when said sash frame is in lowered position, said means comprising a plurality of interlocking hook members, a plurality of links, a vertically movable arm associated with said links, and a disk on said sash frame for cooperation with said arm.

6. A device of the character described, including a lower door portion, a sash frame pivotally mounted thereon and adapted to be moved to upper operative position or lower concealed position, a window slidably mounted in said door portion and said sash frame, and means in said lower door portion for preventing the raising of said window when said sash frame is in lowered position, said means comprising a plurality of interlocking hook members, a plurality of links, a vertically movable arm associated with said links, and a disk on said sash frame for cooperation with said arm and locking means associated with said hook members for holding said arm in lowered position when the window is down.

7. A device of the character described, including, a lower door portion, a sash frame pivoted thereon and adapted to be moved to upper or lower position, a disk on said sash frame and provided with a shoulder portion, a vertically movable arm cooperating with said shoulder portion when said sash frame is in raised position to prevent movement of said sash frame and means for releasing said arm to permit movement of said sash frame.

8. A device of the character described, which includes, a door adapted for use in a vehicle body, said door being provided with a sash frame, a rod or axle for pivotally mounting said sash frame on said door, and means for changing the effective length of said rod or axle for changing or adjusting the tension under which the sash frame is held.

9. A device of the character described, including a lower door portion, a sash frame pivotally mounted thereon and adapted to be moved to upper operative position or lower concealed position, a window slidably mounted in said door portion and said sash frame, and means in said lower door portion for preventing the raising of said window when said sash frame is in lowered position, said means comprising a plurality of interlocking hook members, a plurality of links, a vertically movable arm associated with said links, and a disk on said sash frame for cooperation with said arm, said disk being provided with a shoulder for receiving a portion of said arm and locking the sash frame in raised position.

10. A device of the character described, including a lower door portion, a sash frame pivotally mounted thereon and adapted to be moved to upper operative position or lower concealed position, a window slidably mounted in said door portion and said sash frame, and means in said lower door portion for preventing the raising of said window when said sash frame is in lowered position, said means comprising a plurality of interlocking hook members, a plurality of links, a vertically movable arm associated with said links, and a disk on said sash frame for cooperation with said arm, and means for normally resiliently holding said links and hook members out of operative condition when the window is in raised position.

11. A device of the character described, including, a lower door portion provided with slots, a sash frame pivotally mounted on said lower door portion and having disks positioned in said slots, said disks being tapered so as to facilitate the raising and lowering of said sash frame.

12. A device of the character described, including, a lower door portion provided with tapered slots, a sash frame pivotally mounted on said lower door portion and having disks received in said slots so as to facilitate the raising and lowering of said sash frame.

THRASYBULE D. LAZARIDES.